(12) United States Patent
Lin et al.

(10) Patent No.: US 8,077,569 B2
(45) Date of Patent: Dec. 13, 2011

(54) METHODS AND DEVICES FOR CONTROLLING ACCESS TO AN OPTICAL DISC

(75) Inventors: Yu-Hsuan Lin, Taichung (TW); Chih-Ching Chen, Miaoli County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 292 days.

(21) Appl. No.: 12/364,496

(22) Filed: Feb. 2, 2009

(65) Prior Publication Data

US 2009/0274025 A1 Nov. 5, 2009

Related U.S. Application Data

(60) Provisional application No. 61/050,598, filed on May 5, 2008.

(51) Int. Cl.
*G11B 17/00* (2006.01)

(52) U.S. Cl. .............. 369/47.38; 369/47.47; 369/53.3; 369/53.34; 369/53.43

(58) Field of Classification Search .............. 369/47.38, 369/47.47, 47.48, 53.3, 53.34, 53.43
See application file for complete search history.

(56) References Cited

U.S. PATENT DOCUMENTS

| | | | | |
|---|---|---|---|---|
| 4,190,860 A * | 2/1980 | Somers et al. | ................. | 369/240 |
| 4,514,771 A * | 4/1985 | Stark et al. | ................. | 360/73.03 |
| 4,530,018 A * | 7/1985 | Hoshino et al. | ............ | 360/73.03 |
| 4,530,083 A * | 7/1985 | Ishihara | ......................... | 369/267 |
| 4,542,423 A * | 9/1985 | Kotake et al. | .............. | 360/73.03 |
| 4,641,294 A * | 2/1987 | Yoshimaru | ................. | 369/30.12 |
| 4,751,693 A * | 6/1988 | Yoshimaru | ................. | 369/30.12 |
| 4,757,488 A * | 7/1988 | Nagai et al. | ................. | 369/47.47 |
| 4,789,975 A * | 12/1988 | Taniyama | ................... | 369/47.47 |
| 5,596,558 A * | 1/1997 | Arataki et al. | ............. | 369/53.18 |
| 5,636,192 A * | 6/1997 | Shimizume et al. | ........ | 369/47.28 |
| 5,654,951 A * | 8/1997 | Hoover et al. | ................. | 369/97 |
| 5,694,380 A * | 12/1997 | Shimizume et al. | ....... | 369/47.45 |
| 5,870,363 A * | 2/1999 | Sun et al. | .................. | 369/47.45 |
| 6,081,492 A * | 6/2000 | Asai et al. | .................. | 369/59.14 |
| 6,192,012 B1* | 2/2001 | Kim | .......................... | 369/47.26 |
| 6,304,531 B1* | 10/2001 | Koudo et al. | .............. | 369/47.23 |
| 6,529,456 B2* | 3/2003 | Koudo et al. | .............. | 369/47.48 |
| 6,958,966 B2* | 10/2005 | Tateishi et al. | ............... | 369/53.3 |
| 7,791,996 B2* | 9/2010 | Arisaka | ...................... | 369/47.27 |
| 7,813,231 B2* | 10/2010 | Nishiyama et al. | ........ | 369/44.26 |
| 2001/0006501 A1* | 7/2001 | Park | .......................... | 369/47.39 |
| 2002/0145961 A1* | 10/2002 | Tsai et al. | .................. | 369/53.22 |
| 2003/0061000 A1* | 3/2003 | Cheng et al. | ................. | 702/150 |
| 2003/0169654 A1* | 9/2003 | Hino et al. | .................. | 369/44.34 |
| 2003/0174611 A1* | 9/2003 | Chou | ......................... | 369/47.48 |
| 2008/0231218 A1* | 9/2008 | Oh et al. | .................. | 318/400.11 |

* cited by examiner

*Primary Examiner* — Wayne Young
*Assistant Examiner* — Brenda Bernardi
(74) *Attorney, Agent, or Firm* — Winston Hsu; Scott Margo (57) ABSTRACT

A device for controlling access to an optical disc includes a control word calculator and a numerically controlled oscillator (NCO). The control word calculator is arranged to calculate a control word corresponding to a radius where the optical disc is accessed. In addition, the NCO is arranged to generate an output frequency according to the control word, wherein the output frequency is utilized for accessing the optical disc. An associated method for controlling access to an optical disc includes: calculating a control word corresponding to a radius where the optical disc is accessed; and generating an output frequency according to the control word, wherein the output frequency is utilized for accessing the optical disc.

20 Claims, 7 Drawing Sheets

METHODS AND DEVICES FOR CONTROLLING ACCESS TO AN OPTICAL DISC

CROSS REFERENCE TO RELATED APPLICATIONS

This application claims the benefit of U.S. Provisional Application No. 61/050,598, which was filed on May 5, 2008, and entitled "WOBBLELESS DISK WRITE APPROACH".

BACKGROUND OF THE INVENTION

1. Field of the Invention

The present invention relates to optical disc access control, and more particularly, to methods and devices for controlling access to an optical disc.

2. Description of the Related Art

A conventional optical disc device typically comprises a closed loop generating a channel bit clock for accessing an optical disc. According to the related art, the closed loop is implemented as a phase locked loop (PLL). For example, in a reading procedure of the optical disc device, the PLL receives a data signal derived from the optical disc, and utilizes the data signal as a reference signal for the operation of the PLL. As the data signal is read from the optical disc and the PLL generates the channel bit clock by utilizing the data signal as the reference signal, and as the optical disc device reads the data signal from the optical disc based on the channel bit clock, it is indeed a closed loop and the control thereof requires many high accuracy components. As a result, a tradeoff between reducing the costs of the conventional optical disc device and preventing the closed loop control from being degraded is introduced.

In another example, when the optical disc is a Rewritable disc with wobbles pre-grooved on the optical disc, the wobbles typically carry certain disc information and address information. The PLL receives a wobble signal derived from the optical disc in accordance with the wobbles, and utilizes the wobble signal as the reference signal for the operation of the PLL. As the wobble signal is read from the optical disc and the PLL generates the channel bit clock by utilizing the wobble signal as the reference signal, and as the optical disc device utilizes the channel bit clock to access the optical disc, it is indeed a closed loop and the control thereof also requires many high accuracy components. Similarly, the above-mentioned tradeoff is again introduced.

In order to reduce the costs of the conventional optical disc device, a novel method is therefore required for reducing the costs of the products without lowering the performance, in order to benefit both the end users and the manufacturers.

SUMMARY

It is therefore an objective of the claimed invention to provide methods and devices for controlling access to an optical disc, in order to solve the above-mentioned problem.

It is another objective of the claimed invention to provide methods and devices for controlling access to an optical disc, in order to reduce costs of products (e.g. optical storage devices implemented according to the present invention, and associated control circuits) without lowering the performance thereof. As a result, the end users and the manufacturers can benefit.

An exemplary embodiment of a device for controlling access to an optical disc comprises a control word calculator and a numerically controlled oscillator (NCO). The control word calculator is arranged to calculate a control word corresponding to a radius where the optical disc is accessed. In addition, the NCO is arranged to generate an output frequency according to the control word, wherein the output frequency is utilized for accessing the optical disc.

An exemplary embodiment of a method for controlling access to an optical disc comprises: calculating a control word corresponding to a radius where the optical disc is accessed; and generating an output frequency according to the control word, wherein the output frequency is utilized for accessing the optical disc.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
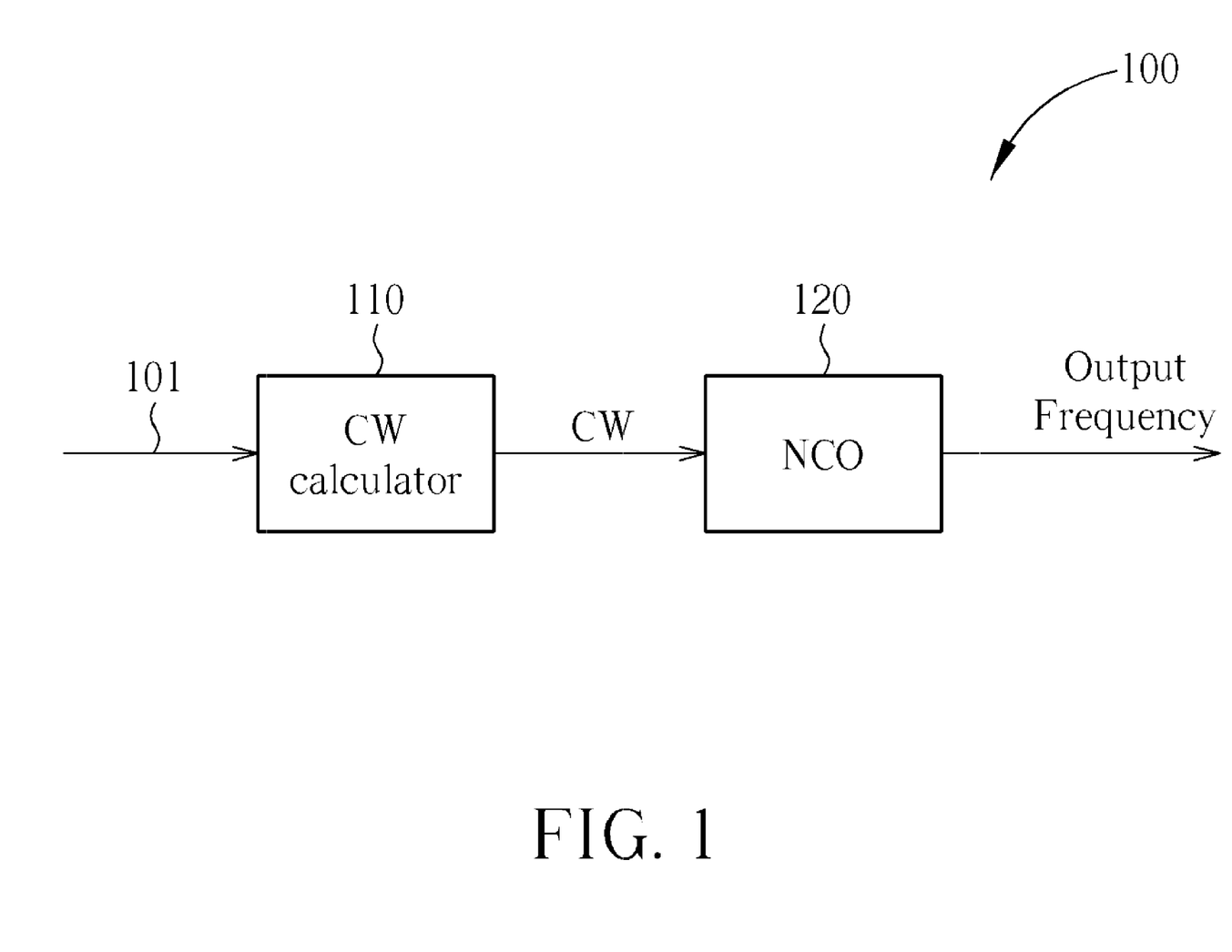
FIG. 1 is a diagram of a device for controlling access to an optical disc according to a first embodiment of the present invention.

Please refer to FIG. 1, which illustrates a diagram of a device for controlling access of an optical disc according to a first embodiment of the present invention. The device of this embodiment is a device 100 for controlling access to an optical disc, wherein the device 100 can be seen as a part of an optical storage device. This is for illustrative purposes only, and is not meant to be a limitation of the present invention. According to a variation of this embodiment, the device represented by the numeral shown in FIG. 1 can be a portion of the optical storage device, such as a control circuit within the optical storage device. According to another variation of this embodiment, the device mentioned above can be at least a portion of the optical storage device, such as the whole of the optical storage device.

As shown in FIG. 1, the device comprises a control word calculator 110 (labeled "CW calculator") and a numerically controlled oscillator (NCO) 120. The control word calculator 110 is arranged to calculate a control word CW corresponding to a radius where the optical disc is accessed (i.e. the radius where an optical pickup unit (OPU) of the device 100 accesses the optical disc). In addition, the numeral 101 labeled at an input of the control word calculator 110 represents a radius indicator corresponding to the radius where the optical disc is accessed.

For example, the radius indicator 101 can be a counter value related to revolutions of the optical disc, for example, the counter value is derived from a hall sensor of the device 100, and the control word calculator 110 calculates the control word CW according to the counter value. In another example, the radius indicator 101 can be an elapsed time representing a number of elapsed revolutions of the optical disc (e.g. the elapsed revolutions are proportional to the number of elapsed revolutions), and the control word calculator 110 calculates the control word CW according to the elapsed time. In another example, the radius indicator 101 can be a coding address such as an encoding address or a decoding address for accessing the optical disc (e.g. an encoding address for writing the optical disc, or a decoding address for reading the optical disc), and the control word calculator 110 calculates the control word CW according to the encoding address or the decoding address.

According to this embodiment, the NCO 120 is arranged to generate an output frequency according to the control word CW, where the control word CW may represent a frequency control word (FCW) value or a period control word (PCW) value. In practice, the NCO 120 can be implemented with a specific circuit comprising a voltage controlled oscillator (VCO) (not shown) controlled by a digital-to-analog converter (DAC) (not shown), where the control word CW represents an FCW value, and the control word calculator 110 can be referred to as the FCW calculator. Thus, the NCO 120 generates the output frequency by controlling a frequency of the output of the VCO according to the FCW value represented by the control word CW. This is for illustrative purposes only, and is not meant to be a limitation of the present invention.

According to a variation of this embodiment, the NCO 120 can be implemented with the specific circuit equipped with a voltage mapping circuitry, where the control word CW represents a PCW value, and the control word calculator 110 can be referred to as the PCW calculator. Thus, the NCO 120 generates the output frequency by controlling a period of the output of the VCO according to the PCW value represented by the control word CW. According to another variation of this embodiment, the NCO 120 can be implemented with an oscillator of another type.

In addition, the output frequency is utilized for accessing the optical disc. For example, the output frequency is utilized as a clock signal, and can be utilized for writing or reading the optical disc, such as utilized for encoding or decoding, wherein the clock signal can be referred to as a channel bit clock. In another example, the output frequency is utilized for performing spindle control during a writing procedure or a reading procedure.

According to a special case of this embodiment, the device 100 operates in a constant angular velocity (CAV) mode, and the output frequency is utilized as a clock, which is described as the channel bit clock later. In this special case, the linear velocity is proportional to the radius while the OPU is moving from inner tracks to outer tracks of the optical disc. The control word calculator 110 is arranged to calculate the control word CW according to this relationship and according to characteristics of the control word calculator 110 mentioned above. As a result of the calculations of the control word calculator 110 in this special case, the output frequency has a properly increased frequency while the OPU is moving from the inner tracks to the outer tracks of the optical disc, and therefore can be utilized as a channel bit clock.

According to another special case of this embodiment, the device 100 operates in a constant linear velocity (CLV) mode, and the output frequency is utilized for further operation, such as performing spindle control. In the CLV mode, the angular velocity is inversely proportional to the radius while the OPU is moving from the inner tracks to the outer tracks of the optical disc. The control word calculator 110 is arranged to calculate the control word CW according to this relationship and according to characteristics of the control word calculator 110 mentioned above. As a result of the calculations of the control word calculator 110 in this special case, the output frequency has a properly decreased frequency while the OPU is moving from the inner tracks to the outer tracks of the optical disc, and therefore can be utilized for performing spindle control.

In contrast to the related art, the present invention devices such as the device shown in FIG. 1 and the associated methods mentioned above help end users and the manufacturers to get benefit from the reduction in related costs.

It is another advantage of the present invention that, in a situation where the optical disc is a wobbleless disc, the present invention methods and devices can be utilized for controlling access to the optical disc without difficulties that will be encountered by the closed loop control of the related art. When access the wobbleless disc, the encoding or decoding address used to obtain the radius indicator 101 described above is derived from data address.

Figure 2:
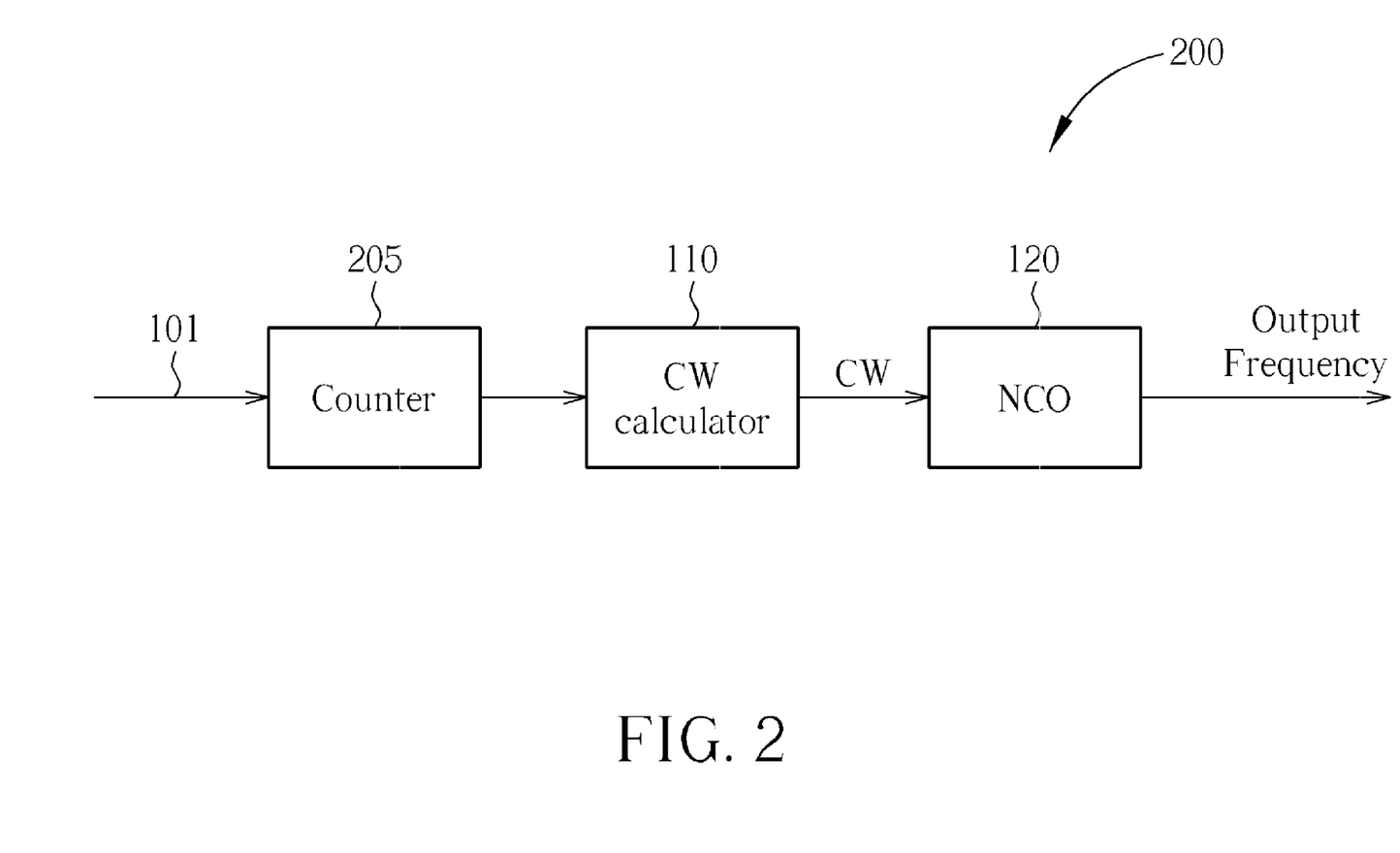
FIG. 2 is a diagram of a device for controlling access to an optical disc according to a second embodiment of the present invention.

FIG. 2 is a diagram of a device for controlling access to an optical disc according to a second embodiment of the present invention, where this embodiment is a variation of the first embodiment. The numeral 100 is replaced by another numeral 200 since a counter 205 is inserted between the radius indicator 101 and the control word calculator 110. This is for illustrative purposes only, and is not meant to be a limitation of the present invention. According to a variation of this embodiment, the device mentioned above can be a portion of the optical storage device of the second embodiment, such as a control circuit within the optical storage device. According to another variation of this embodiment, the device mentioned above can be at least a portion of the optical storage device of the second embodiment, such as the whole of the optical storage device.

In this embodiment, the counter 205 is arranged to generate a counter value corresponding to the radius where the optical disc is accessed. For example, the counter 205 counts the radius indicator 101 mentioned above to generate a counter value, where the counter value is utilized as a representative of the radius indicator 101, and is therefore input into the control word calculator 110.

In addition, the output frequency is utilized as a channel bit clock. This is for illustrative purposes only, and is not meant to be a limitation of the present invention. According to a variation of this embodiment, the output frequency is utilized for performing spindle control. Similar descriptions for this embodiment or for associated variations thereof are not repeated in detail here.

Figure 3:
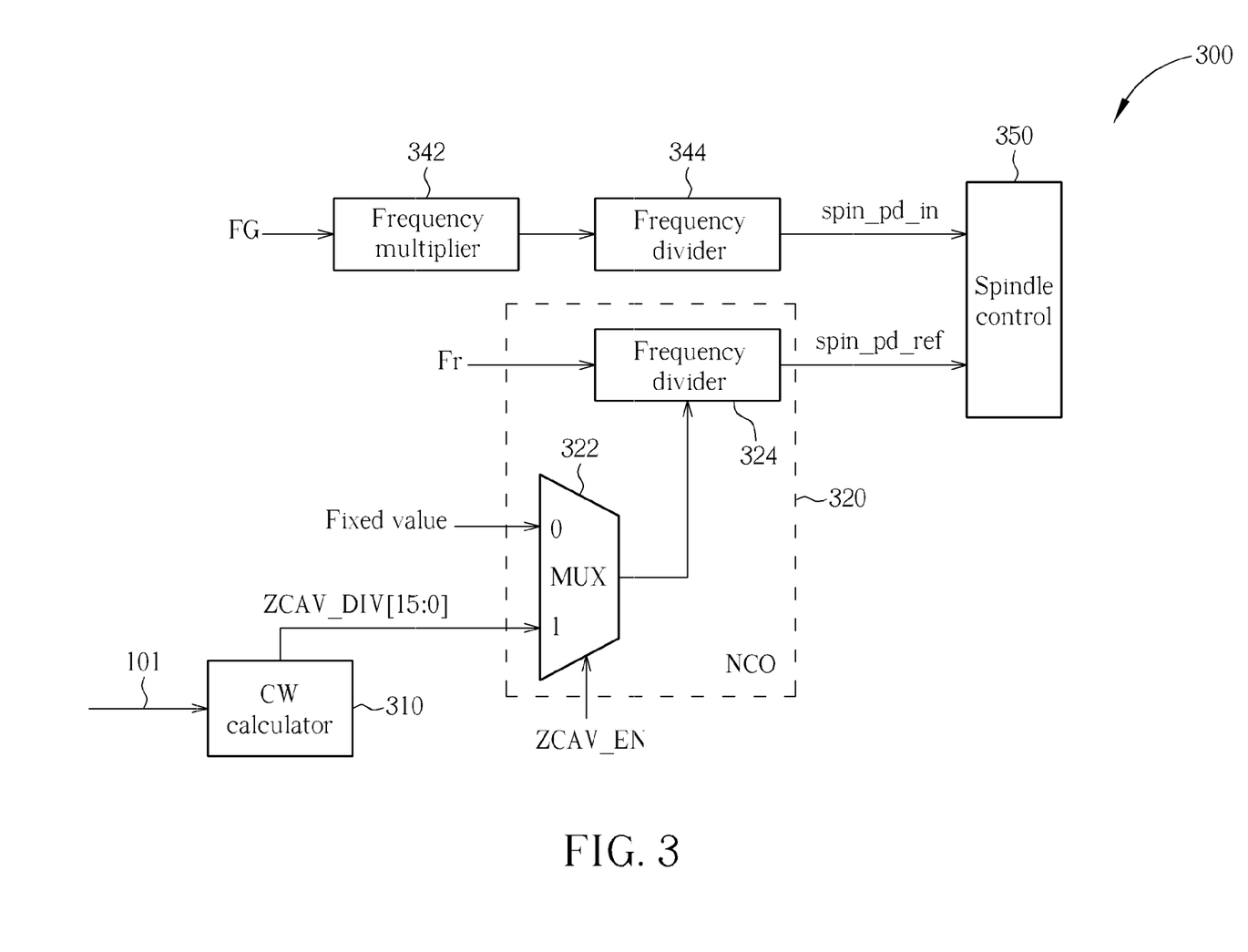
FIG. 3 is a diagram of a device for controlling access to an optical disc according to a third embodiment of the present invention.

FIG. 3 is a diagram of a device for controlling access to an optical disc according to a third embodiment of the present invention. The device of this embodiment is a device 300 for controlling access to an optical disc. This is for illustrative purposes only, and is not meant to be a limitation of the present invention. According to a variation of this embodiment, the device represented by the numeral 300 shown in FIG. 3 can be a portion of the optical storage device of the third embodiment, such as a control circuit within the optical storage device. According to another variation of this embodiment, the device mentioned above can be at least a portion of the optical storage device of the third embodiment, such as the whole of the optical storage device.

As shown in FIG. 3, the device comprises a control word calculator 310 (labeled "CW calculator"), a NCO 320 and a spindle control circuit 350 (labeled "Spindle control"), where the NCO 320 of this embodiment comprises a multiplexer 322 (labeled "MUX") and a frequency divider 324. In addition, the device further comprises a frequency multiplier and/or a frequency divider, such as a frequency multiplier 342 and a frequency divider 344.

The control word calculator 310 is arranged to calculate a control word ZCAV_DIV[15:0] corresponding to a radius where the optical disc is accessed (i.e. the radius where an OPU of the device 300 accesses the optical disc). More particularly, the control word calculator 310 generates the control word ZCAV_DIV[15:0] according to the radius indicator 101 mentioned above.

In addition, a selection signal ZCAV_EN is utilized for enabling the NCO 320 to receive the control word ZCAV_DIV[15:0]. When the selection signal ZCAV_EN is in a state "0", the NCO 320 receives a fixed value (such as a fixed value '2048') through an input terminal "0" of the multiplexer 322. As a result, the NCO 320 is arranged to generate an output frequency spin_pd_ref according to the fixed value. When the selection signal ZCAV_EN is in a state "1", the NCO 320 receives the control word ZCAV_DIV[15:0] through an input terminal "1" of the multiplexer 322. As a result, the NCO 320 is arranged to generate the output frequency spin_pd_ref according to the control word ZCAV_DIV[15:0], where the output frequency is utilized for accessing the optical disc. Please note that the frequency divider 324 is arranged to convert a reference frequency Fr into the output frequency spin_pd_ref according to a divisor corresponding to the control word ZCAV_DIV[15:0], where the frequency divider 324 performs a frequency dividing operation on the reference frequency Fr to generate the output frequency spin_pd_ref.

In this embodiment, the frequency multiplier 342 and the frequency divider 344 are arranged to convert a hall sensor output frequency FG into a frequency spin_pd_in. It is noted that the frequency spin_pd_in is derived from a hall sensor which detects the operation of a spindle (not shown), and the frequency spin_pd_in can be taken as a feedback frequency. In addition, the spindle control circuit 350 is arranged to perform spindle control according to the output frequency spin_pd_ref and the feedback frequency spin_pd_in. More particularly, the spindle control circuit 350 comprises a frequency detector (FD) (not shown) or a phase detector (PD) (not shown), arranged to detect a difference between the output frequency spin_pd_ref and the feedback frequency spin_pd_in.

As mentioned, the NCO 320 of this embodiment comprises the frequency divider 324 arranged to convert the reference frequency Fr into the output frequency spin_pd_ref according to the divisor corresponding to the control word ZCAV_DIV[15:0]. This is for illustrative purposes only, and is not meant to be a limitation of the present invention. According to a variation of this embodiment, the NCO 320 comprises a frequency multiplier (not shown) arranged to convert the reference frequency Fr into the output frequency spin_pd_ref according to a multiplicator corresponding to the control word ZCAV_DIV[15:0]. According to another variation of this embodiment, the NCO 320 comprises a frequency multiplier (not shown) and/or a frequency divider, arranged to convert the reference frequency Fr into the output frequency spin_pd_ref according to at least one multiplicator/divisor corresponding to the control word ZCAV_DIV[15:0].

Figure 4:
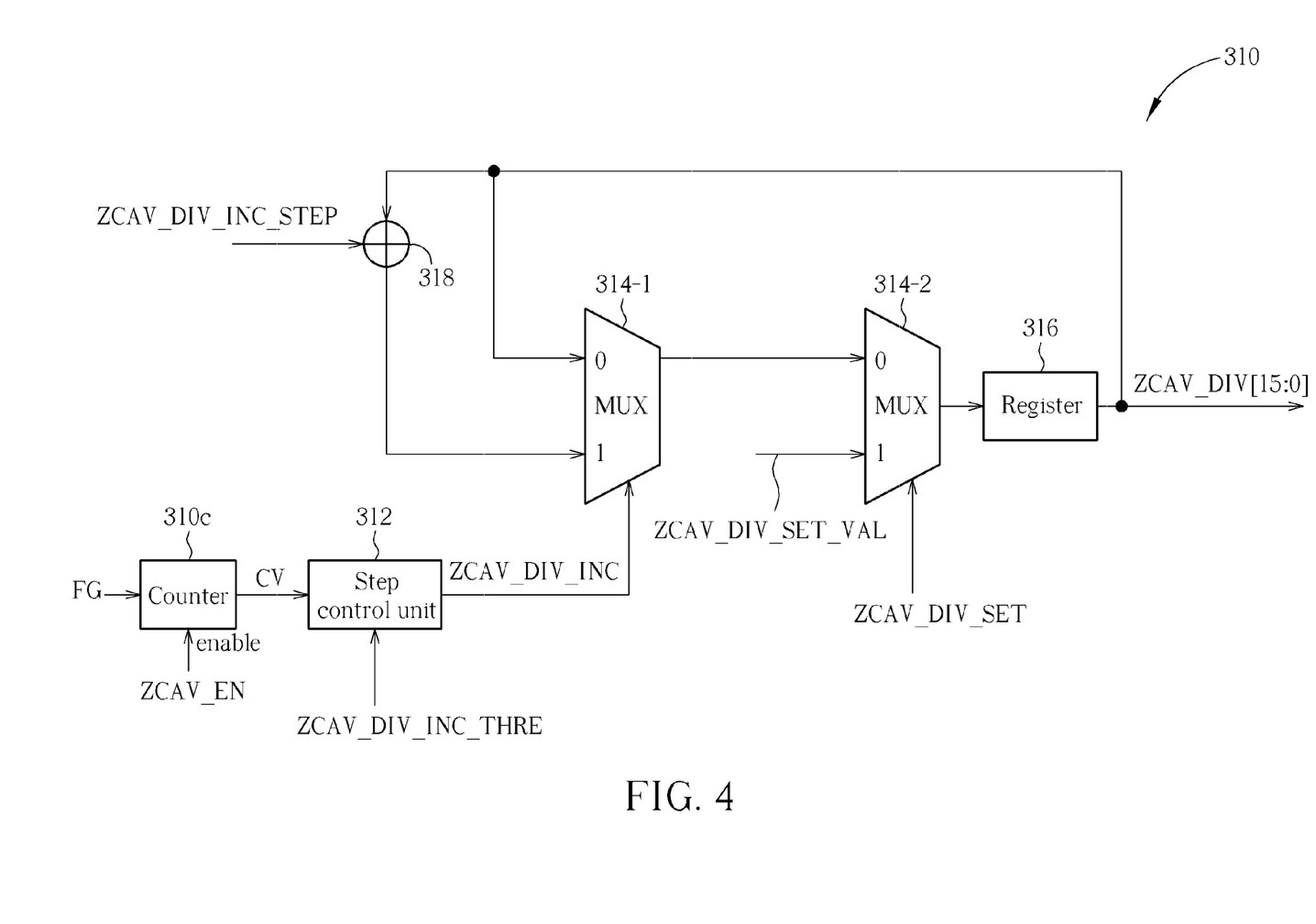
FIG. 4 illustrates implementation details of the control word calculator (labeled "CW calculator") shown in FIG. 3 according to one embodiment of the present invention.

FIG. 4 illustrates implementation details of the control word calculator 310 shown in FIG. 3 according to one embodiment of the present invention, where the radius indicator 101 of this embodiment is derived from the hall sensor output frequency FG mentioned above. The control word calculator 310 comprises a counter 310c, a step control unit 312, a plurality of multiplexers 314-1 and 314-2 (labeled "MUX"), a register 316 and an adder 318. Please note that the multiplexers 314-1 and 314-2 are two copies of the multiplexer 322 shown in FIG. 3. As a result, operations of the multiplexers 314-1 and 314-2 are similar to the above-mentioned operations of the multiplexer 322.

According to this embodiment, the counter 310c counts revolutions of the optical disc based on the hall sensor output frequency FG to generate a counter value CV corresponding to a number of elapsed revolutions of the optical disc, where the selection signal ZCAV_EN is utilized for enabling the counting operation of the counter 310c. When the selection signal ZCAV_EN changes from the state "0" to the state "1", the counter 310c starts to count the counter value CV with an initial value to make the counter value CV start from zero. When the counter 310c starts to count the counter value CV, it is suggested that the control word calculator 310 should apply a setting signal ZCAV_DIV_SET_VAL carrying an initial value of the control word ZCAV_DIV[15:0] to the multiplexer 314-2, and the initial value of the control word ZCAV_DIV[15:0] is stored into the register 316.

Most of the time, another two selection signals ZCAV_DIV_SET and ZCAV_DIV_INC are typically in the state "0" to keep the control word ZCAV_DIV[15:0] from being changed. The control word calculator 310 sets the selection signal ZCAV_DIV_SET to be in the state "1" when applying the setting signal ZCAV_DIV_SET_VAL to the multiplexer 314-2 is required. In addition, the step control unit 312 sets the selection signal ZCAV_DIV_INC to be in the state "1" when increasing the control word ZCAV_DIV[15:0] with an increment is required. More particularly, when the counter value CV is equal to a threshold value ZCAV_DIV_INC_THRE or a multiple of the threshold value ZCAV_DIV_INC_THRE, the step control unit 312 sets the selection signal ZCAV_DIV_INC to be in the state "1". As a result, the control word calculator 310 increases the control word ZCAV_DIV[15:0] with the increment every ZCAV_DIV_INC_THRE counts of the counter value CV.

In this embodiment, increasing the control word ZCAV_DIV[15:0] with the increment is implemented with the adder 318 arranged to receive an increment step ZCAV_DIV_INC_STEP representing the increment. This is for illustrative purposes only, and is not meant to be a limitation of the present invention. According to a variation of this embodiment, in a situation where decreasing the control word ZCAV_DIV[15:0] with a decrement is required, the adder 318 can be replaced with a subtractor arranged to receive a decrement step ZCAV_DIV_DEC_STEP (not shown) representing the decrement.

According to this variation, the selection signal ZCAV_DIV_INC and the threshold value ZCAV_DIV_INC_THRE can be renamed as generalized names, for example, the selection signal ZCAV_DIV_INC_DEC and the threshold value ZCAV_DIV_INC_DEC_THRE, respectively. As a result, the control word calculator 310 increases the control word ZCAV_DIV[15:0] with the increment every ZCAV_DIV_INC_DEC_THRE counts of the counter value CV in an increasing mode, and decreases the control word ZCAV_DIV[15:0] with the decrement every ZCAV_DIV_INC_DEC_THRE counts of the counter value CV in a decreasing mode.

Figure 5:
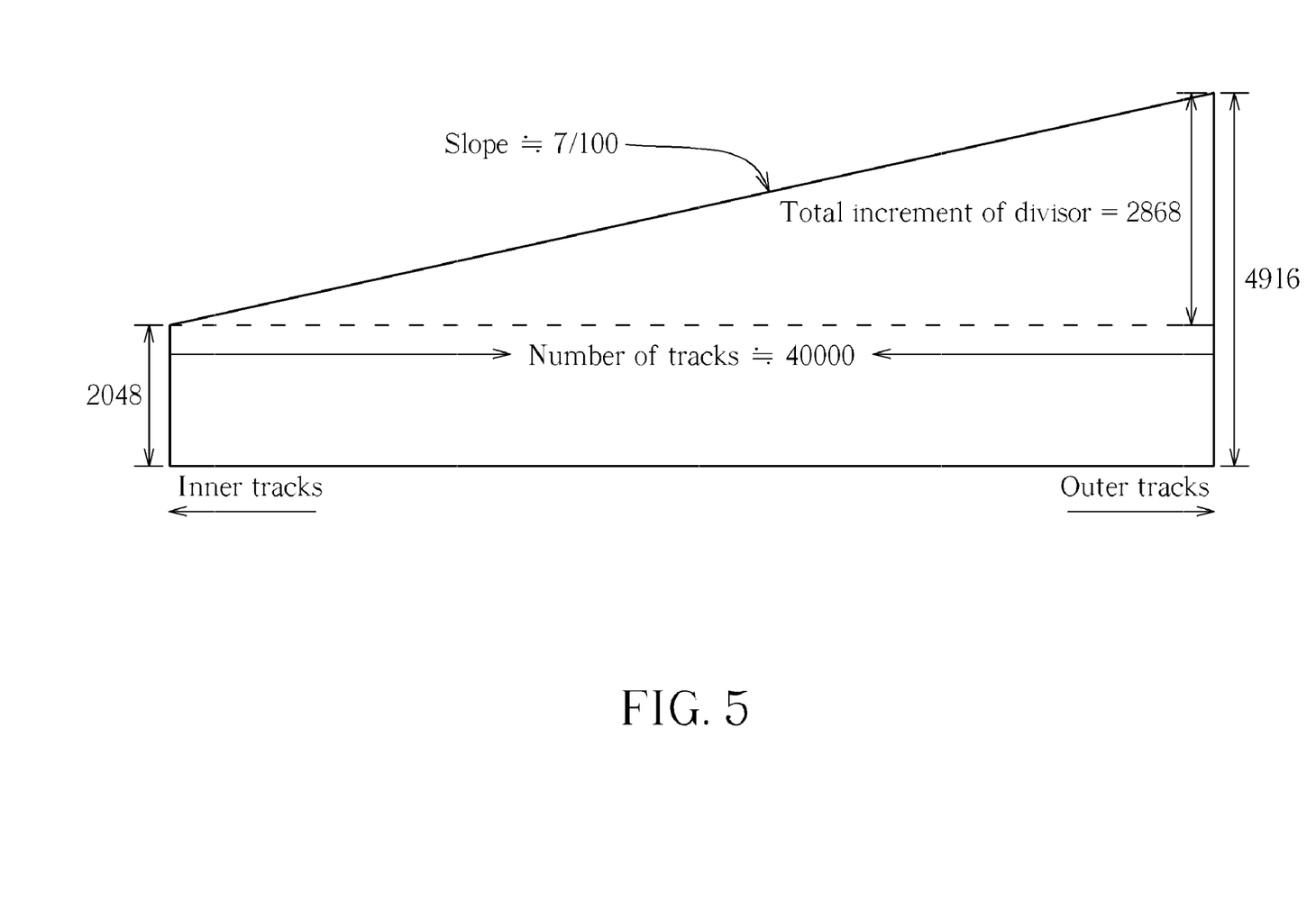
FIG. 5 illustrates practical design values that the control word calculator shown in FIG. 3 utilizes for calculations according to the embodiment shown in FIG. 4.

FIG. 5 illustrates practical design values that the control word calculator 310 shown in FIG. 3 utilizes for calculations according to the embodiment shown in FIG. 4. The inclined line on the top is extracted from a portion of a design curve with the horizontal and the vertical axes respectively representing an accessed track (e.g. the track where the OPU accesses the optical disc) and a divisor (e.g. the divisor corresponding to the control word ZCAV_DIV[15:0]).

As shown in FIG. 5, the divisor changes from 2048 to 4916 while the OPU is moving from the inner tracks to the outer tracks of the optical disc, where 4916/2048=2.4 approximately, while 2.4 represents a ratio of the maximal radius to the minimal radius of the tracks. As the number of tracks is around 40000, and as the total increment of the divisor is equal to 2868, the slope of the inclined line is around 2686/40000=7/100 approximately. Therefore, the setting signal ZCAV_DIV_SET_VAL can be set as 2048, and the increment step ZCAV_DIV_INC_STEP and the threshold value ZCAV_DIV_INC_THRE can be set as 7 and 100, respectively.

Please note that, according to the architecture shown in FIG. 3, the spindle control circuit 350 typically performs the spindle control to maintain the feedback frequency spin_pd_in and the output frequency spin_pd_ref at the same frequency. The feedback frequency spin_pd_in can be expressed according to the following equation:

$$\text{spin\_pd\_in} = FG*(Mf)/(Df);$$

where Mf and Df respectively represent the multiplicator of the frequency multiplier 342 and the divisor of the frequency divider 344 on the feedback path (i.e. the path from FG to the spindle control circuit 350).

In addition, the output frequency spin_pd_ref can be expressed according to the following equation:

$$\text{spin\_pd\_ref} = Fr/(Dr);$$

where Dr represents the divisor of the frequency divider 324 on the reference path (i.e. the path from Fr to the spindle control circuit 350).

In order to maintain the feedback frequency spin_pd_in and the output frequency spin_pd_ref the same, let spin_pd_in=spin_pd_ref, which means $$FG*(Mf)/(Df) = Fr/(Dr);$$

In the third embodiment, by changing the divisor Dr (e.g. the divisor Dr is proportional to the radius), the frequency divider 324 is utilized for implementing the NCO 320 of this embodiment. This is for illustrative purposes only, and is not meant to be a limitation of the present invention.

Therefore, the spindle control circuit 350 of the device 300 is arranged to control the disc to operate in several CAV modes with different angular velocities, wherein the different angular velocities are inversely proportional to the radius, and the angular velocities reduce from the inner tracks to the outer tracks of the optical disc based on the equation: FG*(Mf)/(Df)=Fr/(Dr). By utilizing this device 300a, when the difference between the angular velocities is small enough, the optical disc can operate in a CLV mode approximately.

Figure 6:
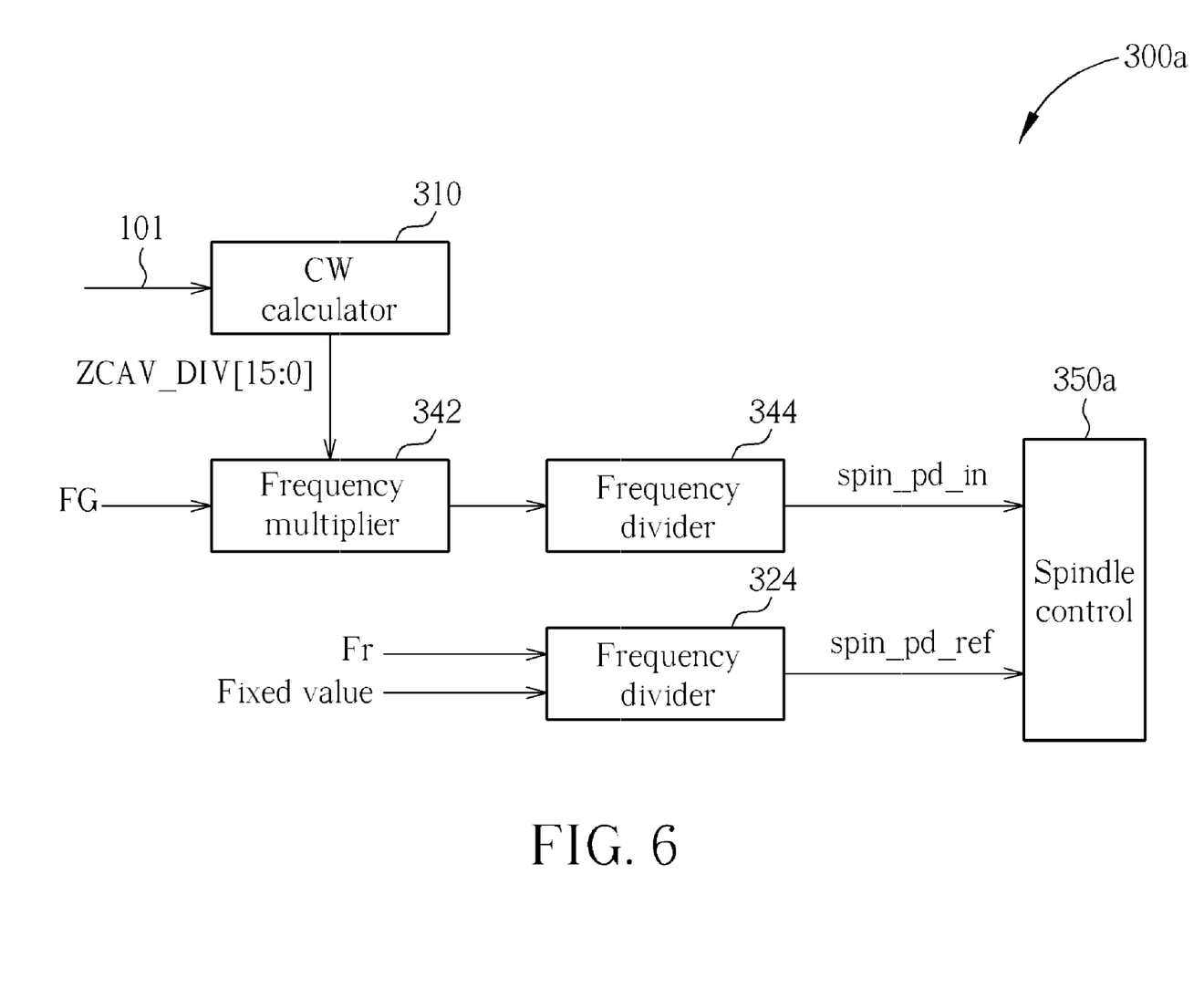
FIG. 6 is a diagram of a device for controlling access to an optical disc according to another embodiment of the present invention.

According to a variation of the third embodiment, such as the variation shown in FIG. 6, by changing the multiplicator Mf (e.g. the multiplicator Mf is proportional to the radius), the frequency multiplier 342 can be utilized for implementing the NCO 320 of this variation, where the output of the multiplexer 322 is redirected to the frequency multiplier 342 in order to control the multiplicator Mf with the control word ZCAV_DIV[15:0]. Therefore, the spindle control circuit 350a of the device 300a is arranged to control the disc to operate in a CLV mode approximately. Similar descriptions for this variation are not repeated in detail here.

Figure 7:
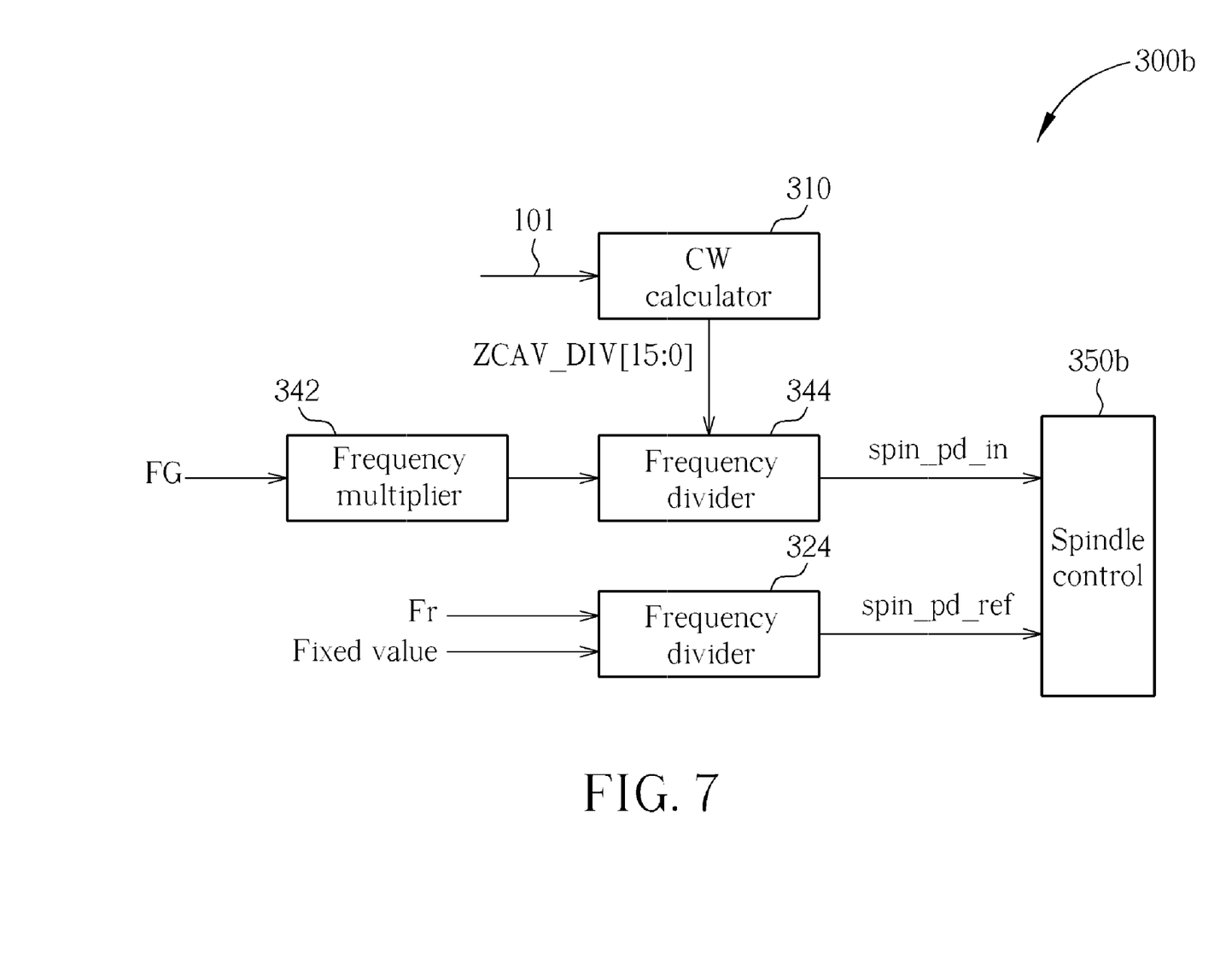
FIG. 7 is a diagram of a device for controlling access to an optical disc according to another embodiment of the present invention.

According to another variation of the third embodiment, such as the variation shown in FIG. 7, by changing the divisor Df (e.g. the divisor Df is inversely proportional to the radius), the frequency divider 344 can be utilized for implementing the NCO 320 of this variation, where the output of the multiplexer 322 is redirected to the frequency divider 344 in order to control the divisor Df with the control word ZCAV_DIV[15:0]. Therefore, the spindle control circuit 350b of the device 300b is arranged to control the disc to operate in a CLV mode approximately. Similar descriptions for this variation are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for controlling access to an optical disc, comprising:
   a control word calculator, in a feedback path, arranged to calculate a control word corresponding to a radius where the optical disc is accessed; and
   a numerically controlled oscillator (NCO) arranged to generate an output frequency according to the control word, wherein the output frequency is utilized for accessing the optical disc.

2. The device of claim 1, further comprising:
   a spindle control circuit arranged to perform spindle control according to the output frequency and a first reference frequency; and
   a frequency multiplier and/or a frequency divider, arranged to convert a second reference frequency into the first reference frequency.

3. The device of claim 2, wherein the NCO comprises:
   a frequency multiplier and/or a frequency divider, arranged to convert a hall sensor output frequency into the output frequency according to at least one multiplicator/divisor corresponding to the control word.

4. The device of claim 2, wherein the spindle control circuit comprises:
   a frequency detector or a phase detector, arranged to detect a difference between the output frequency and the first reference frequency.

5. The device of claim 1, further comprising:
   a counter arranged to generate a counter value corresponding to the radius where the optical disc is accessed;
   wherein the output frequency is utilized as a channel bit clock.

6. The device of claim 1, wherein the control word calculator calculates the control word according to a counter value related to revolutions of the optical disc, wherein the counter value is derived from a hall sensor.

7. The device of claim 1, wherein the control word calculator calculates the control word according to an elapsed time representing a number of elapsed revolutions of the optical disc.

8. The device of claim 1, wherein the control word calculator calculates the control word according to a coding address for accessing the optical disc.

9. The device of claim 1, wherein the output frequency is utilized for writing the optical disc.

10. The device of claim 1, wherein the optical disc is a wobbleless disc.

11. A method for controlling access to an optical disc, comprising:
   calculating a control word, in a feedback path, corresponding to a radius where the optical disc is accessed; and
   generating an output frequency according to the control word, wherein the output frequency is utilized for accessing the optical disc.

12. The method of claim 11, further comprising:
   performing spindle control according to the output frequency and a first reference frequency; and
   converting a second reference frequency into the first reference frequency by utilizing a frequency multiplier and/or a frequency divider.

13. The method of claim 12, wherein the step of generating the output frequency according to the control word further comprises:
   converting a hall sensor output frequency into the output frequency according to at least one multiplicator/divisor corresponding to the control word by utilizing a frequency multiplier and/or a frequency divider.

14. The method of claim 12, wherein the step of performing spindle control according to the output frequency and the first reference frequency further comprises:
   detecting a difference between the output frequency and the first reference frequency by utilizing a frequency detector or a phase detector.

15. The method of claim 11, further comprising:
   generating a counter value corresponding to the radius where the optical disc is accessed; and
   utilizing the output frequency as a channel bit clock.

16. The method of claim 11, wherein the step of calculating the control word corresponding to the radius where the optical disc is accessed further comprises:
   calculating the control word according to a counter value generated from a hall sensor.

17. The method of claim 11, wherein the step of calculating the control word corresponding to the radius where the optical disc is accessed further comprises:
   calculating the control word according to an elapsed time representing a number of elapsed revolutions of the optical disc.

18. The method of claim 11, wherein the step of calculating the control word corresponding to the radius where the optical disc is accessed further comprises:
   calculating the control word according to a coding address for accessing the optical disc.

19. The method of claim 11, wherein the output frequency is utilized for writing the optical disc.

20. The method of claim 11, wherein the optical disc is a wobbleless disc.

* * * * *